(12) United States Patent
Frenne et al.

(10) Patent No.: US 11,711,845 B2
(45) Date of Patent: Jul. 25, 2023

(54) USER EQUIPMENT, NETWORK NODE AND METHODS THEREIN FOR HANDLING PREAMBLE TRANSMISSIONS ON A RANDOM ACCESS CHANNEL IN A RADIO COMMUNICATIONS NETWORK

(71) Applicant: Telefonaktiebolaget LM Ericsson (publ), Stockholm (SE)

(72) Inventors: Mattias Frenne, Uppsala (SE); Johan Bergman, Stockholm (SE); Erik Eriksson, Linkoping (SE); Fredrik Gunnarsson, Linkoping (SE); Anders Wallen, Ystad (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/951,607

(22) Filed: Nov. 18, 2020

(65) Prior Publication Data
US 2021/0076410 A1    Mar. 11, 2021

Related U.S. Application Data

(63) Continuation of application No. 14/767,641, filed as application No. PCT/SE2014/050806 on Jun. 27, 2014, now abandoned.
(Continued)

(51) Int. Cl.
*H04W 74/00* (2009.01)
*H04W 74/08* (2009.01)
(Continued)

(52) U.S. Cl.
CPC ....... *H04W 74/004* (2013.01); *H04W 56/001* (2013.01); *H04W 72/02* (2013.01);
(Continued)

(58) Field of Classification Search
CPC .............. H04L 12/413; H04L 47/245; H04W 74/0833; H04W 56/001; H04J 3/0635
See application file for complete search history.

(56) References Cited

U.S. PATENT DOCUMENTS

| 2012/0026952 | A1 | 2/2012 | Okubo |
| 2016/0165640 | A1* | 6/2016 | Yang ................. H04W 72/0413 370/336 |

(Continued)

FOREIGN PATENT DOCUMENTS

| CN | 101904130 A | 12/2010 |
| CN | 101940130 | 12/2010 |

(Continued)

OTHER PUBLICATIONS

U.S. Appl. No. 61/922,056 of US 2016/0323917 (Year: 2016).*
(Continued)

*Primary Examiner* — Jung H Park
(74) *Attorney, Agent, or Firm* — Baker Botts L.L.P.

(57) ABSTRACT

The embodiments herein relate to a user equipment (121) and a method performed by the UE (121) for performing preamble transmissions, on a random access channel, to a network node (110). The method comprising: determining (801) a starting subframe for the preamble transmissions based on at least a system frame number (SFN), a number of times (R) the preamble transmissions is to be repeated and a random access channel configuration, and transmitting (802), to the network node (121) the preamble repeatedly starting in the determined starting subframe. The embodiments herein also relate to a network node (110) and a method performed by the network node (110).

20 Claims, 9 Drawing Sheets

Related U.S. Application Data

(60) Provisional application No. 61/937,669, filed on Feb. 10, 2014.

(51) Int. Cl.
*H04W 56/00* (2009.01)
*H04W 72/21* (2023.01)
*H04W 72/02* (2009.01)

(52) U.S. Cl.
CPC ......... *H04W 72/21* (2023.01); *H04W 74/006* (2013.01); *H04W 74/0833* (2013.01); *H04W 56/0045* (2013.01)

(56) References Cited

U.S. PATENT DOCUMENTS

2016/0323917 A1* 11/2016 Hwang .................. H04W 4/70
2016/0330723 A1* 11/2016 Gao ................. H04W 72/0446
2016/0353440 A1* 12/2016 Lee ....................... H04W 52/48

FOREIGN PATENT DOCUMENTS

| CN | 102308649 | 1/2012 |
|----|-----------|--------|
| CN | 102325382 A | 1/2012 |
| CN | 102421087 | 4/2012 |
| CN | 103053216 | 4/2013 |
| WO | 2012 115419 A2 | 8/2012 |

OTHER PUBLICATIONS

CN First Office Action re Application No. 201480075268.X—dated Oct. 25, 2018.
PCT Notification of Transmittal of the International Search Report and the Written Opinion of the International Searching Authority, or the Declaration for International application No. PCT/SE2014/050806—dated Sep. 29, 2014.
3rd Generation Partnership Project; Technical Specification Group Radio Access Network; Evolved Universal Terrestrial Radio Access (E-UTRA); Physical channels and modulation (Release 12); 3GPP Draft; Draft 36211-C00, 3rd Generation Partnership Project (3GPP), Mobile Competence Centre—Dec. 16, 2013.
P42795 Brazil Preliminary Office Action Analysis—dated Jul. 24, 2020.
42795 Brazil Preliminary Amendment Report—dated Jul. 24, 2020.
Office Action issued for Chinese Patent Application No. 201911076011.7 (English Summary attached)—dated Dec. 14, 2022.
Search Report issued for Chinese Patent Application No. 201911076011.7—dated Dec. 8, 2022.

* cited by examiner

USER EQUIPMENT, NETWORK NODE AND METHODS THEREIN FOR HANDLING PREAMBLE TRANSMISSIONS ON A RANDOM ACCESS CHANNEL IN A RADIO COMMUNICATIONS NETWORK

PRIORITY

This application is a continuation, under 35 U.S.C. § 120 of U.S. patent application Ser. No. 14/767,641, which is a U.S. National Stage Filing under 35 U.S.C. § 371 of International Patent Application Serial No. PCT/SE2014/050806 filed Jun. 27, 2014, and entitled "User Equipment, Network Node and Methods Therein for Handling Preamble Transmissions on a Random Access Channel in a Radio Communications Network", which claims priority to U.S. Provisional Patent Application No. 61/937,669 filed Feb. 10, 2014, both of which are hereby incorporated by reference in their entirety.

TECHNICAL FIELD

Embodiments herein relate to transmissions on a random access channel in a radio communication network. In particular, embodiments herein relate to a user equipment and a method therein for performing preamble transmissions on the random access channel, to a network node. Embodiments also relate to a network node and a method therein for reception of preamble transmissions from the user equipment.

BACKGROUND

In a typical radio communications network, wireless terminals, also known as mobile stations, terminals and/or user equipments (UEs) communicate via a Radio Access Network (RAN) to one or more core networks. The radio access network covers a geographical area which is divided into cell areas, with each cell area being served by a base station, e.g. a radio base station (RBS) or network node, which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcasted in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System (UMTS) is a third generation mobile communication system, which evolved from the second generation (2G) Global System for Mobile Communications, (GSM). The UMTS terrestrial radio access network, (UTRAN), is essentially a RAN using wideband code division multiple access (WCDMA9 and/or High Speed Packet Access (HSPA) for user equipments. In a forum known as the Third Generation Partnership Project (3GPP) telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC) which supervises and coordinates various activities of the plural base stations connected thereto. The RNCs are typically connected to one or more core networks.

Specifications for the Evolved Packet System (EPS) have been completed within 3GPP, and this work continues in the coming 3GPP releases. The EPS comprises the Evolved Universal Terrestrial Radio Access Network (E-UTRAN) also known as the Long Term Evolution, LTE, radio access, and the Evolved Packet Core (EPC) also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the RAN, of an EPS has an essentially "flat" architecture comprising radio base station nodes without reporting to RNCs.

Random Access

In LTE, as in any communication system, a UE may need to contact or access the radio communications network, i.e. via the base station, without having a dedicated resource in the uplink or UL, i.e. from UE to base station. To handle this, a random access procedure is available where a UE that does not have a dedicated UL resource may transmit a signal to the base station. The first message of this procedure is typically transmitted on a special resource reserved for random access, a physical random access channel. This random access channel may for example be limited in time and/or frequency, e.g. as in LTE. FIG. 1 is an illustration of an example of a random-access-preamble transmission. Uplink resources used for data transmission are shown as well as uplink resource reserved for random access preamble transmission. Such an uplink resource may comprise 6 resource blocks (RBs) and is 1 ms long corresponding to one subframe. A frame in LTE is comprised of 10 subframes.

In LTE, the UE first detects a cell by using primary and secondary synchronization signals. The UE blindly searches for a number of different sequences and the detected sequences give a physical cell ID (PCI). After detecting the cell, the UE reads the master information block (MIB) on the physical broadcast channel (PBCH) occupying a known resource. The MIB gives the UE information about the system frame number (SFN) and how to detect further system information. More detailed system information is then provided in a number of system information blocks (SIBs). The first SIB, denoted SIB1, comprises the cell identity and scheduling information on how to decode the following SIBs.

Information about the resources available for the physical random access channel (PRACH) transmission is provided to the UEs as part of the broadcasted system information in System Information Block 2 (SIB2) or as part of dedicated radio resource control (RRC) signaling in case of e.g. a handover. The resources comprise a preamble sequence and a time/frequency resource. In each cell, there are 64 preamble sequences available. Two subsets of the 64 sequences are defined, where the set of sequences in each subset is signaled as part of the system information. The time/frequency resources are also associated to a temporary identifier denoted random access radio network temporary identifier (RA-RNTI). The RA-RNTI is according to Eq. 1:

$$RA\text{-}RNTI = 1 + t\_id + 10 * f\_id \qquad \text{(Eq. 1)}$$

where t_id is the index of the first subframe of the specified PRACH, 0≤t_id<10; and f_id is the index of the specified PRACH within that subframe, in ascending order of frequency domain, 0≤f_id<6.

According to the 3GPP technical specifications 3GPP TS 36.211, the multiple random access preambles are generated from one or several Zadoff-Chu sequences. The set of 64 preamble sequences in a cell is found by including the available cyclic shifts from each Zadoff-Chu sequence and adding more Zadoff-Chu sequences as needed. The number of cyclic shifts in a Zadoff-Chu sequence depends on $N_{cs}$ given by the zero correlation zone configuration and whether unrestricted or restricted sets of cyclic shifts are used. The sequences to use and the number of cyclic shifts to use per sequence are signaled in the system information.

When performing a (contention-based) random-access attempt, the UE selects at random one sequence in one of the subsets. As long as no other UE is performing a random-access attempt using the same sequence at the same time instant, no collisions will occur and the attempt will, with a high likelihood, be detected by the base station.

In LTE, the random access procedure may be used for a number of different reasons. Among these reasons are: initial access, i.e. for UEs in the RRC_IDLE state; incoming handover; resynchronization of the UL; scheduling request, i.e. for a UE that is not allocated any other resource for contacting the base station; and positioning.

The contention-based random access procedure used in release 10 of LTE (LTE Rel-10) is illustrated in FIG. 2 depicting signalling over the air interface between the UE and the LTE radio access network node (RAN node) e.g. a eNB or eNodeB.

As previously described, the system information including sequences for random access is signaled to the UE.

As shown in FIG. 2, the UE starts the random access procedure by randomly selecting one of the preambles available for contention-based random access.

The UE then transmits the selected random access preamble on the PRACH to the base station or LTE RAN node.

The LTE RAN base station acknowledges any preamble it detects by transmitting a random access response message (MSG2), including an initial grant to be used on the uplink shared channel, a temporary cell-RNTI (TC-RNTI) and a time alignment (TA) update based on the timing offset of the preamble measured by the base station (or LTE RAN node) on the PRACH. The MSG2 is transmitted in the downlink (DL) to the UE using the physical downlink shared channel (PDSCH) and its corresponding physical downlink control channel (PDCCH) message that schedules the PDSCH comprises a cyclic redundancy check (CRC) which is scrambled with the RA-RNTI.

When receiving the response, the UE uses the grant to transmit a message (MSG3), denoted scheduled transmission that in part is used to trigger the establishment of radio resource control and in part to uniquely identify the UE on the common channels of the cell. The timing alignment command provided in the random access response is applied in the UL transmission in MSG3.

In addition, the eNB (or LTE RAN node) may also change the resources blocks that are assigned for a MSG3 transmission by sending an UL grant that has its CRC scrambled with the TC-RNTI which was included in MSG2. In this case the PDCCH is used to transmit the downlink control information (DCI) comprising the uplink grant.

The MSG4 which is then contention resolving has its PDCCH CRC scrambled with the C-RNTI if the UE previously has a C-RNTI assigned. If the UE does not have a C-RNTI previously assigned the PDCCH CRC is scrambled with the TC-RNTI obtained from MSG2. In the first case the UE included C-RNTI into MSG3 whereas in the latter case the UE included a core network identifier.

The procedure ends with RAN solving any preamble contention that may have occurred for the case that multiple UEs transmitted the same preamble at the same time. This may occur since each UE randomly selects when to transmit and which preamble to use. If multiple UEs select the same preamble for the transmission on RACH, there will be contention between these UEs that needs to be resolved through the contention resolution message, MSG4. Hybrid automatic repeat request (HARQ) acknowledgment (ACK) messages are also shown transmitted from the UE respectively the LTE RAN node. The case when contention occurs is illustrated in FIG. 3 below.

FIG. 3 illustrates an example of contention-based random access, where there is contention between two UEs, $UE_1$ and $UE_2$, i.e. where two UEs transmit the same preamble, $p_5$, at the same time. A third UE, $UE_3$, also transmits on the same RACH, but since it transmits with a different preamble, $p_1$, there is no contention between this UE and the other two UEs.

A UE may also perform non-contention-based random access. A non-contention-based random access or contention-free random access may e.g. be initiated by the base station or eNB, to get the UE to achieve synchronisation in UL. The base station initiates a non-contention-based random access either by sending a PDCCH order or indicating it in an RRC message. The later of the two is used in case of handover to another cell. The eNB may also order the UE through a PDCCH message to perform a contention-based random access.

The procedure for the UE to perform contention-free random access is illustrated in FIG. 4. FIG. 4 illustrates an example of signalling over the air interface for the contention-free random access procedure in LTE.

Similar to the contention-based random access the MSG2 is transmitted in the DL to the UE and its corresponding PDCCH message CRC is scrambled with the RA-RNTI. The UE considers the contention resolution successfully completed after it has received MSG2 successfully. The random access (RA) order is shown transmitted from the LTE RAN node to the UE. The UE responds by transmitting a random access preamble to the LTE RAN node.

For the contention-free random access as for the contention-based random access, MSG2 comprises a timing alignment (TA) value. This enables the base station to set the initial/updated timing according to the UEs transmitted preamble.

It should be mentioned that a UE monitors the physical downlink control channel (PDCCH). In detail, a UE monitors a common search space and a UE specific search space in the PDCCH. In each search space, a limited number of candidates or equivalently PDCCH transmission hypothesis is checked, in every DL subframe. These are known as blind decodes, and the UE checks whether any of the transmitted DCI messages is intended for it. The UE monitors the following RNTI that are associated with the random access and paging procedures for each associated search spaces on PDCCH:

the RA-RNTI for MSG2 is monitored in the common search space.

the TC-RNTI for MSG3 is monitored in the common search space, for reallocating the MSG3 in frequency.

the TC-RNTI for MSG4 is monitored in the common search and UE specific TC-RNTI search space.

the C-RNTI for MSG4 is monitored in the common search and UE specific C-RNTI search space.

The P-RNTI is monitored in the common search space.

Details on Preamble Format and Detection

FIG. 5 shows the detailed timing of the basic random-access preamble, Format 0. The preamble is prefixed with a cyclic prefix (CP) to enable simple frequency domain processing. Its length is in the order of $T_{GP}+T_{DS}=97.5+5$ µs=102.5 µs, where $T_{DS}$ corresponds to the maximum delay spread and $T_{GP}$ corresponds to the maximum round trip time. The CP insures that the received signal is always circular after removing the CP in the random access receiver, and thus can be processed by FFTs (Fast Fourier transform). Therefore, the "active" random-access preamble duration is 1000 µs−2·$T_{GP}$−$T_{DS}$=800 µs. The RA subcarrier spacing is ⅛₀₀ µs=1250 Hz.

Formats 1, 2, 3 in FIG. 5 show the extended preamble formats. Format 1 has an extended CP and is suited for cell radii up to approximately 100 km. However, since no repetition occurs this format is only suited for environments with good propagation conditions. The approximate length of the CP and the preamble are indicated. Format 2 comprises a repeated main preamble and a CP of approximately 200 µs. With a random access opportunity length of 2 ms the remaining guard period is also approximately 200 µs. This format supports cell radii of up to approximately 30 km. Format 3 also comprise a repeated main preamble and an extended CP. Using a RA opportunity length of 3 ms this format supports cell radii of up to approximately 100 km. The approximate length of the CP and the repeated preamble are indicated. In opposite to format 1 format 3 comprises a repeated preamble as shown and Format 3 is therefore better suited for environments with bad propagation conditions.

The requirements on the sequence comprising the preamble are two-fold: good auto-correlation function (ACF) properties and good cross-correlation function (CCF) properties. A sequence that has ideal, i.e. periodic ACF and CCF properties is called the Zadoff-Chu sequence. The periodic ACF of Zadoff-Chu sequence is only non-zero at time-lag zero, and periodic extensions, and the magnitude of the CCF is equal to the square-root of the sequence length, denoted here N. Due to special properties of Zadoff-Chu sequences, the number of sequences is maximized if N is chosen prime. This together with the requirement that the effective RA bandwidth N·1250 Hz should fit into 1.05 MHz leads to N=839.

A Zadoff-Chu sequence of length N may be expressed, in the frequency domain, as Eq. 2:

$$X_{ZC}^{(u)}(k) = e^{-j\pi u \frac{k \cdot (k+1)}{N}} \quad \text{(Eq. 2)}$$

where u is the index of the Zadoff-Chu sequence within the set of Zadoff-Chu sequences of length N.

Out of one Zadoff-Chu sequence—in the following also denoted root sequence—multiple preamble sequences can be derived by cyclic shifting. Due to the ideal ACF of Zadoff-Chu sequence multiple mutually orthogonal sequences may be derived from a single root sequence by cyclic shifting one root sequence multiple times the maximum allowed round trip time plus delay spread in time-domain. The correlation of such a cyclic shifted sequence and the underlying root sequence has its peak no longer at zero but at the cyclic shift. If the received signal has now a valid round trip delay—i.e. not larger than the maximum assumed round trip time—the correlation peak occurs at the cyclic shift plus the round trip delay which is still in the correct correlation zone. This may be seen in FIG. 6.

FIG. 6 shows an example of a transmitted preamble that has a cyclic shift of 2$T_{CS}$. As long as the round trip time is smaller than $T_{CS}$ the correlation peak occurs in the correct zone. For small cells up to 1.5 km radii all 64 preambles can be derived from a single root sequence and are therefore orthogonal to each other. In larger cells not all preambles can be derived from a single root sequence and multiple root sequences must be allocated to a cell. Preambles derived from different root sequences are not orthogonal to each other. FIG. 6 also indicates location of the UE relative the eNB or Node B e.g. UE being close to Node B and UE located almost at cell border. The zones indicating transmitted sequences are enumerated 0, 1, 2, 3, 4 and 5 in FIG. 6. As shown, in case the UE is close to the Node B, the time delay indicating round trip delay is small. But in case the UE is located almost at cell border, the time delay is large.

One disadvantage of Zadoff-Chu sequences is their behaviour at high frequency offsets. A frequency-offset creates an additional correlation peak in time-domain. A frequency offset has to be considered high if it becomes substantial relative to the random RA sub-carrier spacing of 1250 Hz, e.g. from 400 Hz upwards. The offset of the second correlation peak relative to the main peak depends on the root sequence. An offset smaller than $T_{CS}$ may lead to wrong timing estimates, whereas values larger than $T_{CS}$ may increase the false alarm rate. In order to cope with this problem, LTE has a high-speed mode, or better high frequency offset mode, which disables certain cyclic shift values and root sequences so that transmitted preamble and round trip time may uniquely be identified. Additionally a special receiver combining both correlation peaks is required. For cells larger than approximately 35 km no set of 64 preambles exists that allows unique identification of transmitted preamble and estimation of propagation delay, i.e. cells larger than 35 km cannot be supported in high speed mode.

The random access preamble sequences are ordered according to a specified table. The table is designed by first separating all PRACH sequences into two groups based on the quadrature phase shift keying (QPSK) cubic metric (CM) value using a fixed 1.2 dB threshold. The sequences with low CM are more suitable to assign to large cells than the sequences with high CM. Within each CM-group, high and low, the sequences are further grouped according to the maximum allowed cyclic shift, $S_{max}$, at high speed.

There are however a limited number of possible preamble sequences, and different sequences have better or worse properties in terms of coverage. For example, the sequences with good coverage properties are limited. Due to the limitation of sequences, there is a need to reuse the preambles between cells. The network node receivers in two cells where UEs are using the same Zadoff-Chu sequences will detect preambles transmitted in the other cell if they are received with sufficient strength/power and if the same time/frequency resources are configured for PRACH. This problem may be referred to as "overhearing". Overhearing has negative impact on system performance and user experience.

SUMMARY

It is an object of embodiments herein to improve PRACH preamble transmission when using repeated PRACH occasions to enhance radio coverage of the PRACH in a radio communications network and to avoid preamble collisions According to an aspect of embodiments herein, the object is achieved by providing a method performed by a user equipment for performing preamble transmissions, on a random access channel, to a network node, the method comprising: determining a starting subframe for the preamble transmission(s) based on at least: a system frame number (SFN) received from the network node; a number of times (R) the preamble transmission is to be repeated; and a random access channel configuration and transmitting to the network node the preamble repeatedly starting in the determined starting subframe.

According to another aspect of embodiments herein, the object is achieved by providing a user equipment for performing preamble transmission, on a random access channel, to a network node, the user equipment being configured to: determine a starting subframe for the preamble transmission(s) based on at least a SFN received from the network node; a number of times the preamble transmission is to be repeated and a random access channel configuration, and the user equipment is further configured to transmit, to the network node, the preamble repeatedly starting in the determined starting subframe According to another aspect of embodiments herein, the object is achieved by providing a method performed by a network node for receiving preamble transmission(s) from a user equipment on a random access channel, the method comprising: transmitting a SFN to the user equipment; transmitting a random access channel configuration to the user equipment and receiving the preamble transmission repeatedly starting in a starting subframe wherein the starting subframe is determined by the user equipment and the network node based on at least the SFN, the random access channel configuration, and a number of times the preamble transmission is to be repeated.

According to another aspect of embodiments herein, the object is achieved by means of a network node for receiving preamble transmission(s) from a user equipment on a random access channel, the network node being configured to: transmit a SFN to the user equipment. The network node is further configured to transmit a random access channel configuration to the user equipment and to receive the preamble transmission repeatedly starting in a starting subframe wherein the starting subframe is determined by the user equipment and the network node based on at least the SFN, the random access channel configuration, and a number of times the preamble transmission is to be repeated.

An advantage achieved by embodiments herein is to avoid preamble collisions since a defined starting point for each repeated PRACH preamble transmission is determined. Both the user equipment and the network determine the starting point and hence know when a repeated preamble transmission by the user equipment is to occur.

Another advantage achieved by embodiments herein is that system performance and user experience are improved since overhearing of repeated PRACH preamble transmissions in other (neighbouring) cells is reduced.

Yes another advantage achieved is that by introducing means to determine the start subframe, and implicitly the end subframe, of the repeated PRACH transmission of the user equipment, the network node complexity and PRACH false alarm probability may be reduced.

BRIEF DESCRIPTION OF THE DRAWINGS

Embodiments will now be described in more detail in relation to the enclosed drawings. The figures are schematic and simplified for clarity, and they merely show details which are essential for the understanding of the embodiments presented herein, while other details have been left out. Throughout the drawings, the same reference numerals are used for identical or corresponding parts.

DETAILED DESCRIPTION

Figure 1:
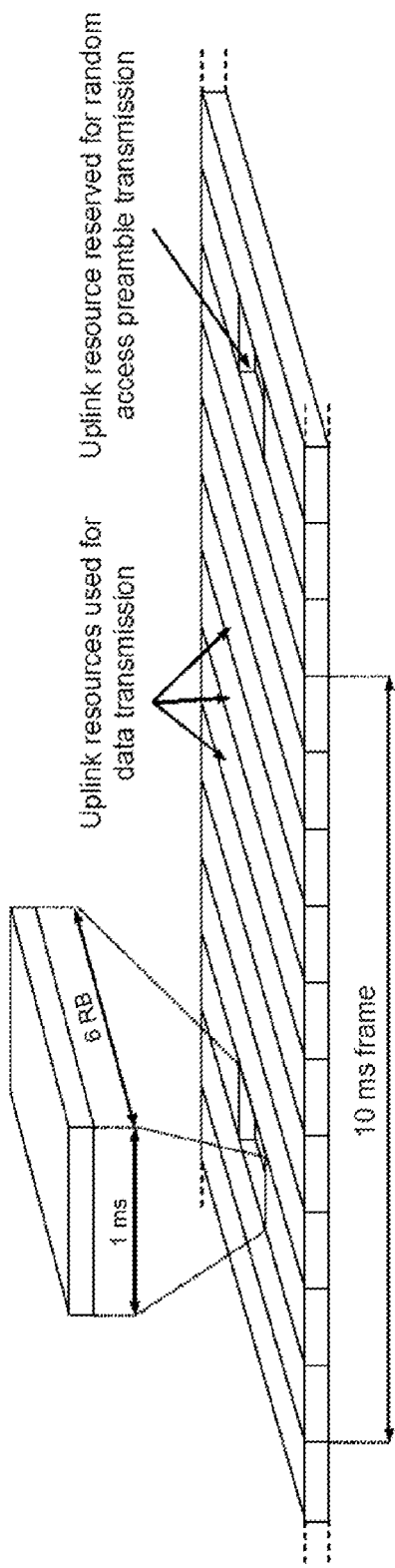
FIG. 1 shows a simplified example of a random-access-preamble transmission.
Figure 2:
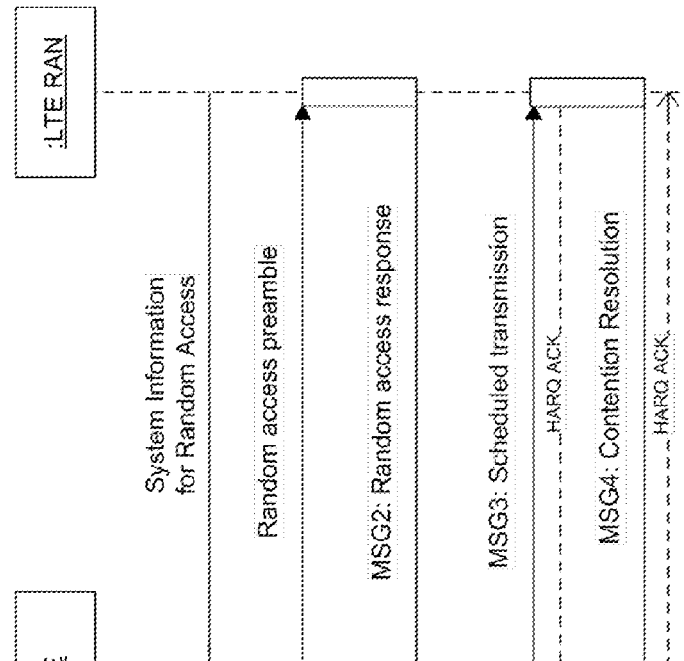
FIG. 2 illustrates signalling messages over the air interface for contention-based random access procedure in LTE.
Figure 3:
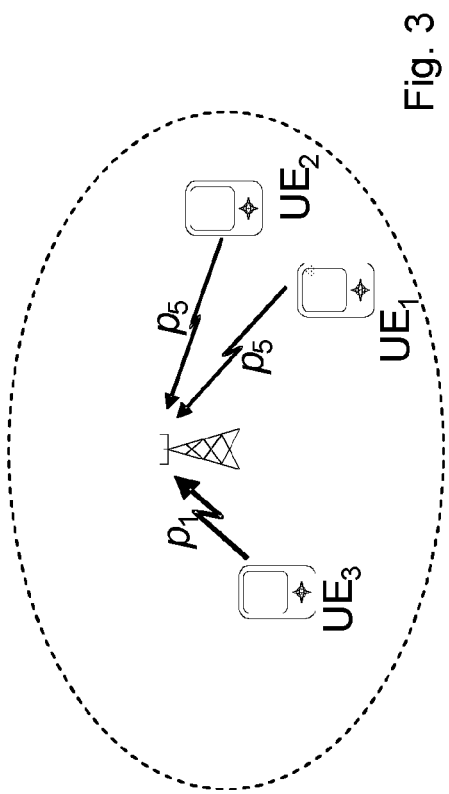
FIG. 3 illustrates a network scenario wherein contention between two UEs occurs during a contention-based random access.
Figure 4:
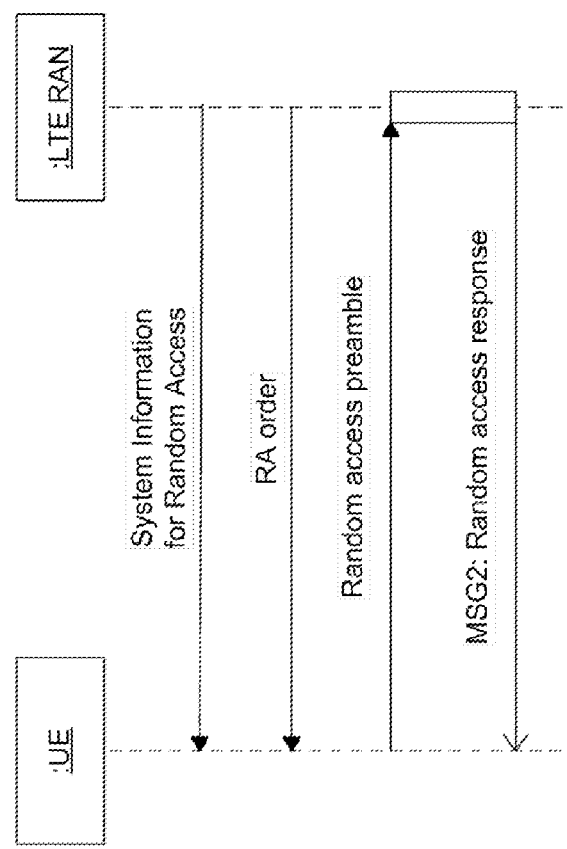
FIG. 4 illustrates an example of signalling messages over the air interface for contention-free random access procedure in LTE.
Figure 5:
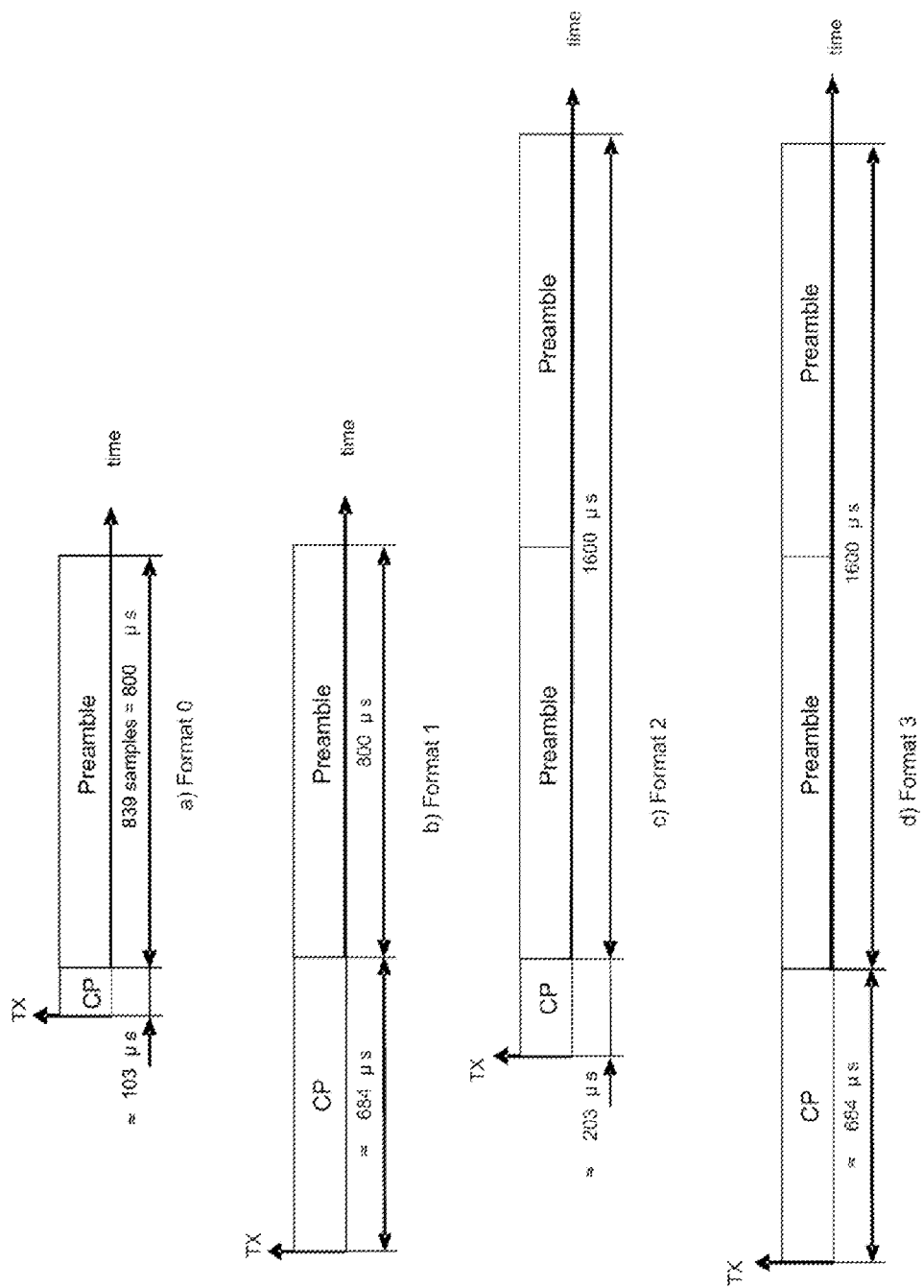
FIG. 5 show random access preambles for different formats 0-3 as defined by 3GPP.
Figure 6:
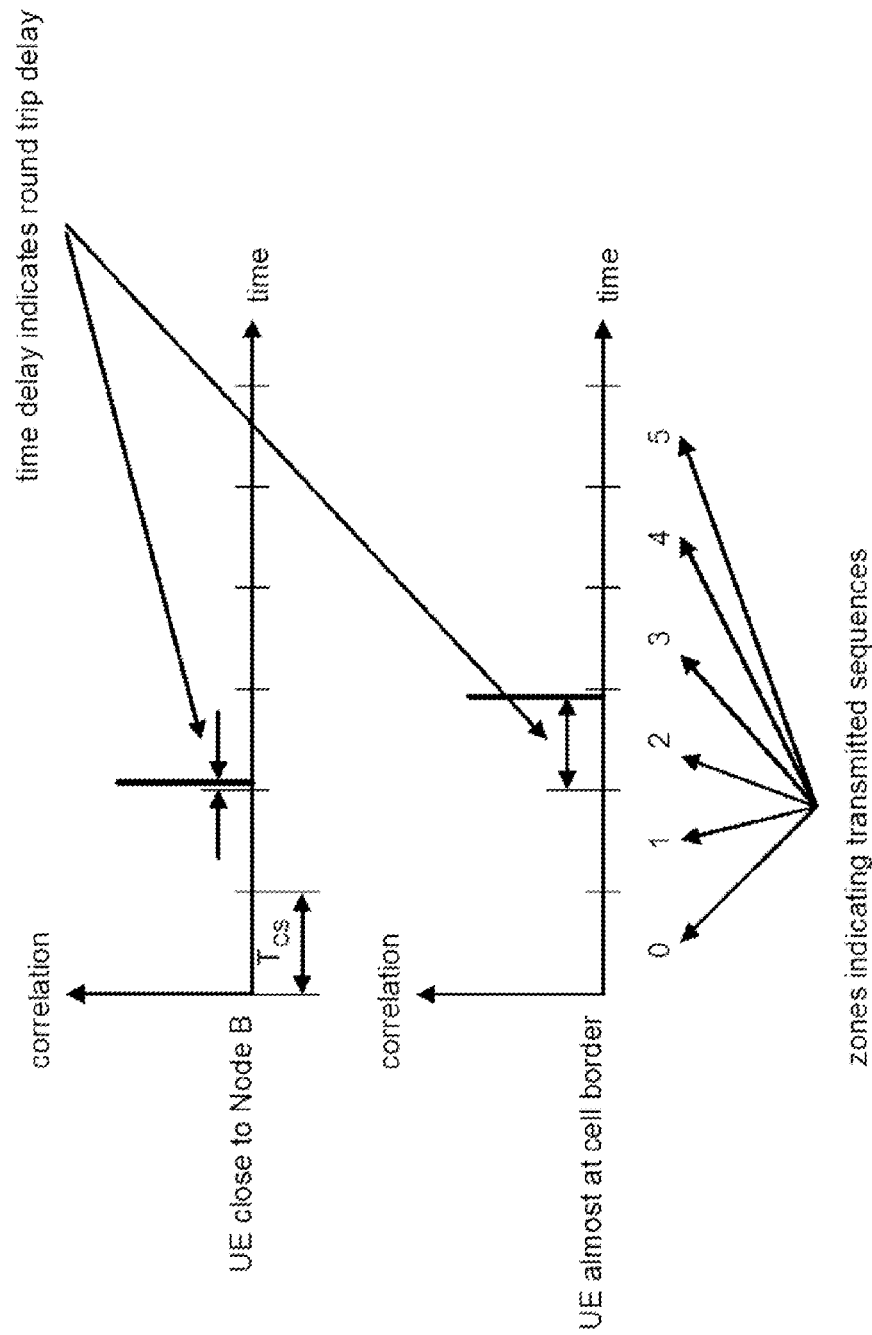
FIG. 6 shows graphs depicting correlation vs time when a UE, based on its location in a cell, transmits preamble(s) or sequences.
Figure 7:
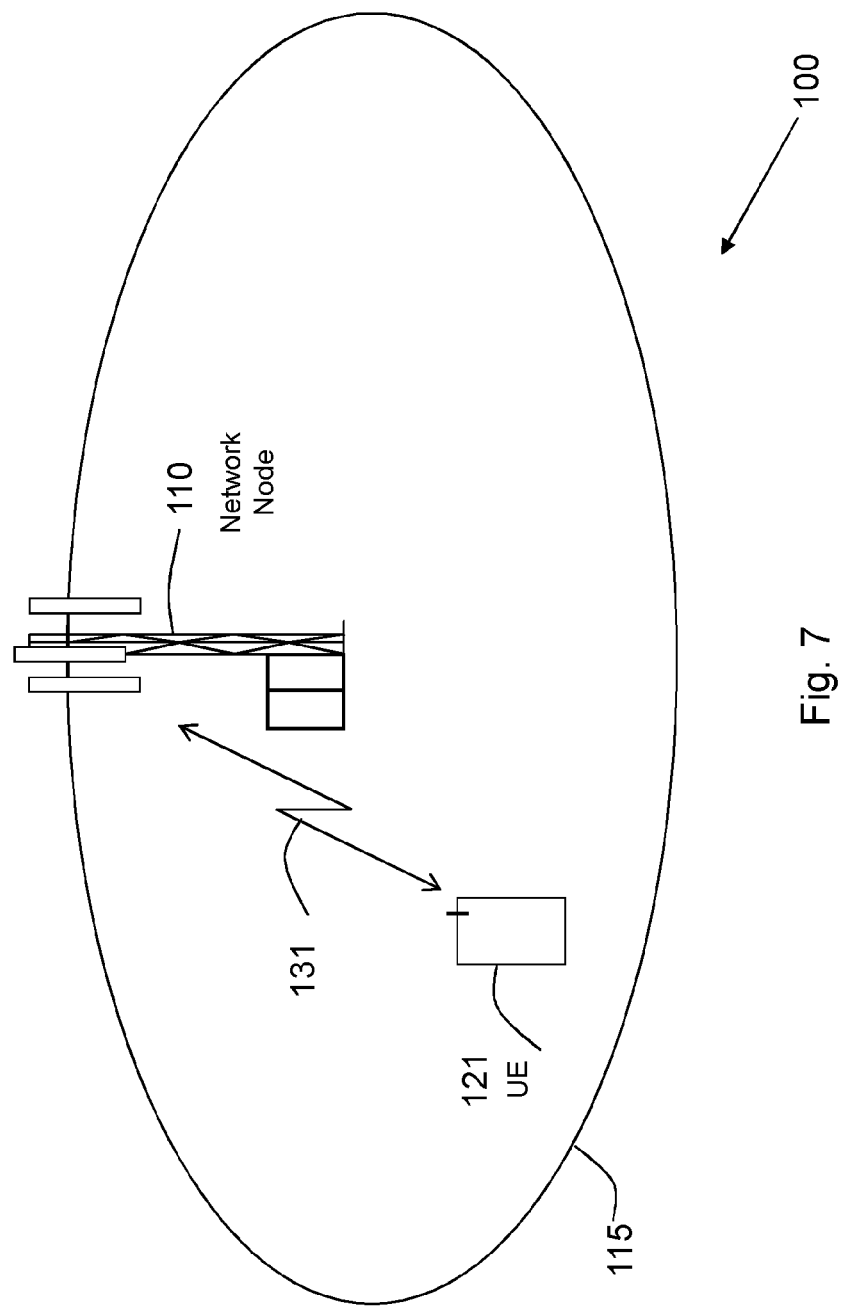
FIG. 7 depicts a radio communications network in which embodiments herein may be implemented.

FIG. 7 depicts a radio communications network 100 in which embodiments herein may be implemented. In some embodiments, the radio communications network 100 may be a wireless communications network such as a LTE, LTE-Advanced, (WCDMA), Global System for Mobile communications/Enhanced Data rate for GSM Evolution (GSM/EDGE), Worldwide Interoperability for Microwave Access (WiMax), Ultra Mobile Broadband (UMB) or GSM, or any other similar cellular network or system. The radio communication network 100 is exemplified herein as an LTE network.

The radio communications network 100 comprises a network node 110. The network node 110 serves at least one cell 115. The network node 110 may e.g. be a base station, a radio base station, eNB, eNodeB, a Home Node B, a Home eNode B, femto Base Station (BS), pico BS or any other network unit capable of communicating with a user equipment within the cell served by the network node depending e.g. on the radio access technology and terminology used. The network node 110 may also be e.g. a base station controller, a network controller, a relay node, a repeater, an access point, a radio access point, a Remote Radio Unit (RRU) or a Remote Radio Head (RRH).

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 115 uniquely in the whole radio communication network 100 is also broadcasted in the cell 115. The network node 110 communicates over the air or radio interface operating on radio frequencies with the UEs within range of the network node 110.

In FIG. 7, a user equipment 121 is shown located within the cell 115. The UE 121 is configured to communicate within the radio communications network 100 via the network node 110 over a radio link 131 when present in the cell 115 served by the network node 110. The UE 121 may e.g. be any kind of wireless device such as a mobile phone, a cellular phone, a Personal Digital Assistant (PDA), a smart phone, a tablet, a sensor equipped with a UE, Laptop Mounted Equipment (LME) (e.g. USB), Laptop Embedded Equipment (LEE), Machine Type Communication (MTC) device, or Machine to Machine (M2M) device, Customer Premises Equipment (CPE), etc.

As previously described, when a UE needs to contact the network without having a dedicated resource in the UL a random access procedure is available as a means to request UL grant. The UE performs preamble or sequence transmissions, on a physical PRACH for that purpose.

In order to reduce cost and enhanced coverage for certain UEs or terminals in LTE, i.e. MTC devices, it has been concluded that the PRACH channel coverage needs to be enhanced. The enhancement will at least partially be realized with repetition. It has been agreed to reuse the existing formats and configurations described previously and in the specification 3GPP TS 36.211, but with repetition over multiple time occasions. The repeated resource may either use the same resource configuration as legacy UEs, with a separation in the preamble sequences used, or there may also be additional resources configured for repetition. A number of different repetition levels may be supported. The repetition level to use in what condition is not fully settled. The configuration of RACH resources may be done using one of the existing system information blocks (SIBs), e.g. SIB2 or in a new SIB.

A network node, e.g. eNB or base station, may combine the transmissions in multiple PRACH occasions to accumulate energy and improve detection of the transmission.

As discussed in the background section above, there are a limited number of possible preamble sequences, and different sequences have better or worse properties in terms of coverage. Especially the sequences with good coverage properties are limited. Due to the limitation of sequences, there is a need to reuse the preambles between cells. The eNB receivers in two cells where UEs are using the same Zadoff-Chu sequences will detect preambles transmitted in the other cell if they are received with sufficient strength and if the same time/frequency resources are configured for PRACH causing "overhearing".

It should be noted that problems with "overhearing" is not significant for normal preamble transmissions, i.e. for legacy or normal UEs, since there are quite many possible root sequences for a UE to select from and therefore "overhearing" may be avoided by proper preamble allocation reuse planning. Moreover, power control is applied and the probability of a preamble being detected in a different cell than the target cell, but configured with the same set of random access preambles, is low. However, for enhanced coverage with repetition as described above, the power control may become very crude and less accurate.

As part of the developing of the embodiments described herein, it has been noted that the detection of repeated preamble transmission with low network complexity and low false alarm probability may be facilitated if the UE and the network node apply the same start subframe, and thus end subframe, for the repeated preambles. However, currently there are no means for the UE and network node to determine the start subframe, and thus end subframe.

In short, the embodiments described hereinafter address these issues by defining a starting point for each repeated PRACH preamble transmission which is known to both UE and network node. In some embodiments, the starting point may be defined as a function of the system frame number, the preamble repetition level and the PRACH resource configuration. This means that separate starting subframes may be applied in the corresponding cells to expand the domain of reuse between cells employing PRACH repetition over multiple PRACH occasions.

In some embodiments, the starting frame offset may be configured by signaling. One example of the signaling is dedicated signaling, so that individual UEs in the cell may be configured with a starting subframe depending on which other cell it is interfering the most with. According to another example, the configuration may be broadcasted by the network node. In some embodiments, the control signaling may be implicit, and be derived by the UE from already existing signaling, e.g. by using the cell-ID. The amount of energy received from neighbor cells using the same root sequence may then be reduced.

Figure 8:
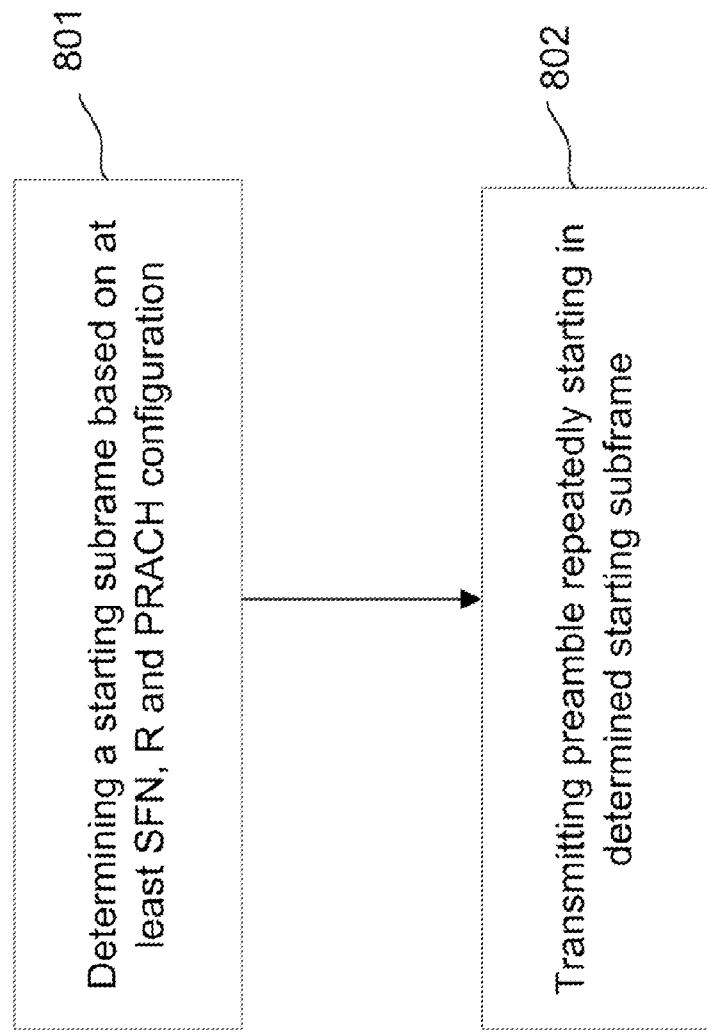
FIG. 8 shows a method performed by a UE for preamble transmissions to a network node in accordance with embodiments herein.

Before describing different exemplary embodiments, the main steps performed by a UE 121 for performing preamble transmission(s), on a random access channel (PRACH), to a network node 110 are presented in relation to FIG. 8.

In action 801, the method comprises, determining a starting subframe for the preamble transmission(s) based on at least: a system frame number (SFN) received from the network node 110; a number of times (R) the preamble transmission(s) is to be repeated; and a random access channel configuration.

In action 802, the method further comprises, transmitting, to the network node 110, the preamble repeatedly starting in the determined starting subframe.

The determined starting subframe may therefore be viewed as a function of the SFN; the preamble repetition level i.e. the number of times R, and the PRACH resource configuration. According to an embodiment, the determined starting subframe is further determined based on a first offset being dependent on the PRACH configuration. The preamble repetition level may also be denoted a bundle size (in number of repeated PRACH occasions).

It should be noted that a PRACH occasion may span more than one subframe and that the starting subframe referred to herein targets or refers to the subframe where the PRACH occasions starts.

In some embodiments, the SFN is given by the master information block (MIB) transmitted on the physical broadcast channel (PBCH) by the network node 110 and the time periodicity of PRACH occasion is given by the PRACH configuration in a SIB e.g. in SIB2 or in a new dedicated SIB.

A PRACH occasion is the occasion to transmit one PRACH format, i.e. format 0, 1, 2, 3 or 4. It should be mentioned that a number of PRACH configurations are available in the specification 3GPP TS 36.211 with different PRACH occasion frequencies. For example, according to the current specification, the PRACH resources may be configured with a frequency ranging from every millisecond (ms), i.e. each subframe, down to once per 20 ms, i.e. once every other radio frame.

If N represents the average number of subframes comprising at least one PRACH resource in a 10-ms period and n; (e.g. N may in current specification take values between 0.5 and 10 dependent on configurations; i=0, . . . , $N_{SFN}$−1) the occasion in the SFN, R the repetition level or bundle size, the starting occasion or subframe may, for example, be given by any SFN and i fulfilling:

$$0=((SFN+T)\cdot N+i) \mod R \qquad (Eq. 3)$$

mod being a modulo operation; T is here a first offset dependent on the PRACH configuration, where for example T=1 if PRACH only is available in odd subframes, else T=0. This means that the start subframe is SFN+i, e.g. all SFN and i fulfilling the equation are possible starting subframes.

For example, when having 2 PRACH occasions in a radio frame, e.g. in subframe #1 and subframe #6, and a PRACH bundling of 3, this may result in a starting in subframe #1 in even SFNs and subframe #6 in odd SFNs, e.g. subframe #1, #16, #31, etc.

In Equation 3, i is a subframe or starting occasion, comprising radio resources configured for the random access channel in frame SFN, wherein i=0, . . . , $N_{SFN}$−1;

As mentioned above, T is the first offset and is dependent on the random access channel configuration and takes value T=1 if radio resources configured for the random access channel are available in only odd-number subframes, otherwise T=0;

$N_{SFN}$ is the number of subframes comprising at least one random access channel resource in frame with SFN; and N is the average number of subframes comprising at least one random access channel resource;

T, N and $N_{SFN}$ being derived from the random access channel configuration provided by the network or provided by the network node to the UE in the random access channel configuration.

According to an embodiment, the starting subframe may be determined based on a second offset being a cell identifier such as a physical cell identity (PCI), received by the UE during synchronization with the network node, or the second offset is a cell identity received in a SIB or determined by the UE based on a physical-layer cell identity. For example, the starting subframe of a repeated bundled PRACH transmission may be offset by a cell specific value K which is here the second offset. For example, it could be based on, or associated to, the PCI signalled by the synchronization signals from the network node upon synchronization with the cell.

For example, in E-UTRAN, there are 504 unique physical-layer cell identities. The physical-layer cell identities are grouped into 168 unique physical-layer cell-identity groups, each group containing three unique identities. The grouping is such that each physical-layer cell identity is part of one and only one physical-layer cell-identity group. A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group.

Hence, K may be determined by the UE 121 based on either $N_{ID}^{cell}$, $N_{ID}^{(1)}$ or $N_{ID}^{(2)}$.

As mentioned above, the second offset K may be received in SIB or determined by the UE based on the physical-layer cell identity. For example K could be related to the cell identity signaled in SIB1, for example the 28 bit cell identifier in SIB1 or parts of the same. The UE 121 may derive K from the first 20 bits identifying the network node 110 or the last 8 bits identifying the cell served by the network node 110.

In some embodiments, K may also be a new parameter value signalled for this purpose (dedicated). This may, for example, be performed in SIB2 or in a new dedicated SIB.

When both the first offset value T and second offset value K are used, a starting subframe or starting occasion is determined for a frame with SFN as any subframe i fulfilling:

$$0=((SFN+T)\cdot N+i+K) \mod R \qquad (Eq. 4)$$

Similarly to Equation 3, i in Equation 4 represents a subframe or starting occasion comprising radio resources configured for the random access channel in a frame SFN, wherein 1=0, . . . , $N_{SFN}$−1;

T is the first offset dependent on the random access channel configuration and takes value T=1 if radio resources configured for the random access channel are available in only odd-number subframes, otherwise T=0;

$N_{SFN}$ is the number of subframes comprising at least one random access channel resource in frame with SFN;

N is the average number of subframes comprising at least one random access channel resource;

According to another embodiment, the starting subframe may be determined based on a preamble sequence dependent offset. For example, the starting subframe of a bundled PRACH transmission may be offset by a PRACH sequence specific value in order to further reduce the potential overhearing between different PRACH sequences within the same cell. For example, the offset value is based on a function of the index of the random access sequence (PRACH sequence). This would also help in reducing PRACH latency. According to an embodiment, the preamble sequence dependent offset may also be a function of the number of times the preamble transmission is to be repeated (R) i.e. the preamble repetition level in order to evenly distribute starting subframes or starting occasions.

After determining the starting subframe, the UE 121 is configured to transmit a preamble repeatedly starting in the determined starting subframe.

Figure 9:
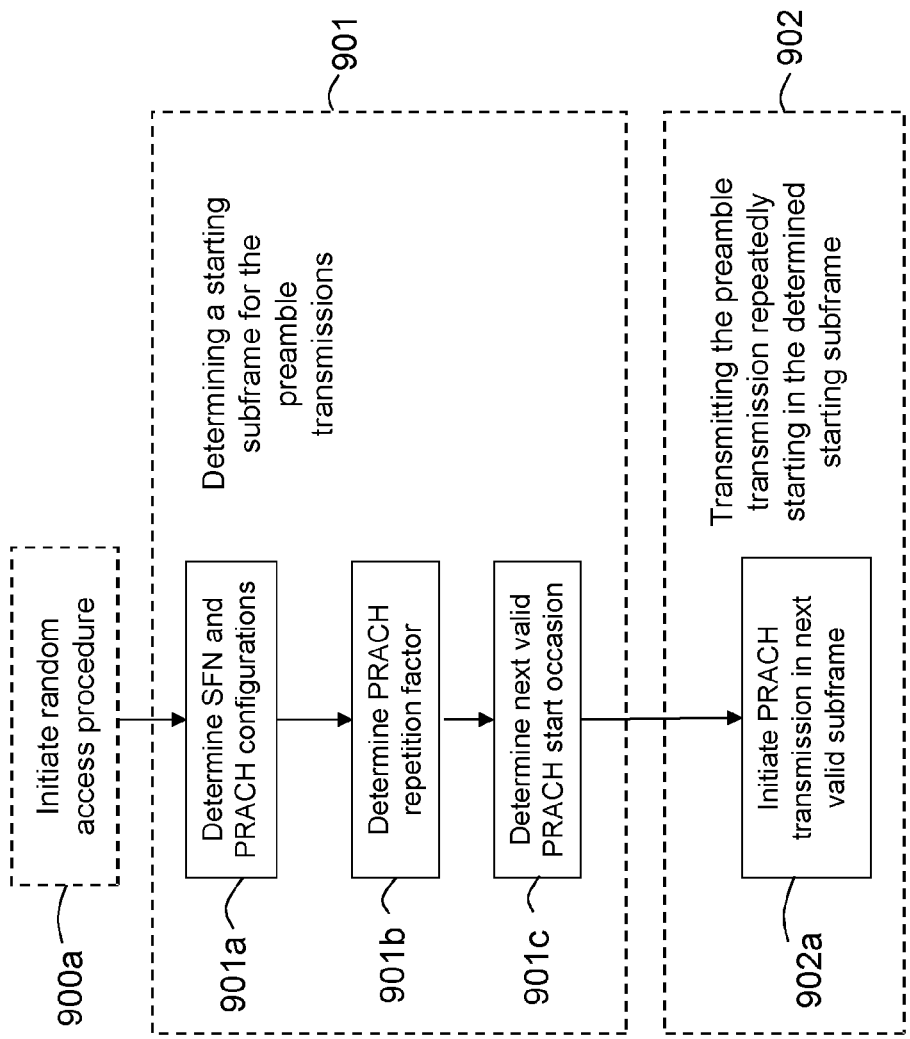
FIG. 9 shows a method performed by a UE for enabling preamble transmissions from a UE in accordance with exemplary embodiments herein.

Referring to FIG. 9, there is illustrated a flowchart depicting exemplary embodiments of a procedure performed by a UE.

As shown, in action 900a, a UE initiates a random access procedure. As previously described, upon initiating the random access procedure, the UE randomly selects one of the available preambles for contention-based random access.

In action 901 and in accordance with the previously described embodiments, the UE determines when to transmit the selected preamble, i.e. the UE determines a starting subframe for the preamble transmission(s). For this purpose and as shown in 901a, the UE determines a SFN and PRACH configuration(s);

In 901b, the UE determines which PRACH repetition factor R to use and in 901c, the UE determines a next valid PRACH start occasion.

In 902a, the UE initiate PRACH transmission in next valid subframe i.e. transmits the preamble repeatedly starting in the determined starting subframe.

In case of time division duplex (TDD), certain configurations enable more than one PRACH opportunity per subframe, but in different frequency bands. Thereby, for TDD, the starting position not only relates to a starting point in time, but possibly also in frequency. With the possibility to consider opportunities in time and frequency domain in combination, it is possible to define opportunity patterns. Such a pattern could be cyclic over the frequency domain random access opportunities, and be defined by a starting point in time and in frequency.

Below is illustrated a plausible time-frequency pattern with three different possible starting points in the frequency domain, 1, 2 and 3. In the example, the time frequency opportunity pattern is defined by a starting point in time and in frequency.

| 3 | 2 | 1 | 3 |
|---|---|---|---|
| 2 | 1 | 3 | 2 |
| 1 | 3 | 2 | 1 |

It should be mentioned that in traditional random access in LTE, the UE obtains a temporary identifier RA-RNTI that is associated to the selected random access opportunity. With repetitive random access preambles, there may be different options how to select the RA-RNTI. In current LTE, it is selected as:

$$RA\text{-}RNTI = 1 + t\_id + 10 * f\_id$$

where t_id is the index of the first subframe of the specified PRACH (0≤t_id<10), and f_id is the index of the specified PRACH within that subframe, in ascending order of frequency domain (0≤f_id<6).

However, given the long foreseen repetitions, it may be more attractive to instead consider the index of the last subframe.

As previously described, the UE may receive one or two offset values from the network node through configuration enabling the UE to determine the starting subframe.

The network node may configure the offset value(s) for a current cell of the UE to be used in determining a starting subframe for the preamble transmissions of the UE.

The network node may aggregate statistics over random access (RA) performance, i.e. monitoring the RA. This means that the network node may obtain certain performance indicators. One example of such a performance indicator is the number of received preambles over a time window. This may be aggregated by the network node in e.g. a counter. Another example of such a performance indicator is the number of required preamble repetitions before the preamble was detected. This may be aggregated by the network node in e.g. a histogram counter. The histogram counter may comprise multiple counters, one for each bin of data, for example, four counters corresponding to 0, 1, 2, 3 repetitions. A further example of such a performance indicator is the number of overheard preambles over a time window. Here, the network node may assume that all received preambles that have not lead to completed RA are due to overhearing.

The statistics may be aggregated over determined time periods in the network node and may be reported regularly by the network node to a network management node. This may also be reported by the network node on demand, or when a pre-configured or configurable criterion is met in the network node. The latter may also be considered or referred to as an alarm. One example of such a configurable criterion is when the number of overheard preambles over a time period exceeds a determined threshold.

As previously described in order to facilitate network node complexity and avoid preamble collisions a defined starting subframe for each repeated PRACH preamble transmission needs to be defined and known not only to the UE but also to the network node or eNB.

Figure 10:
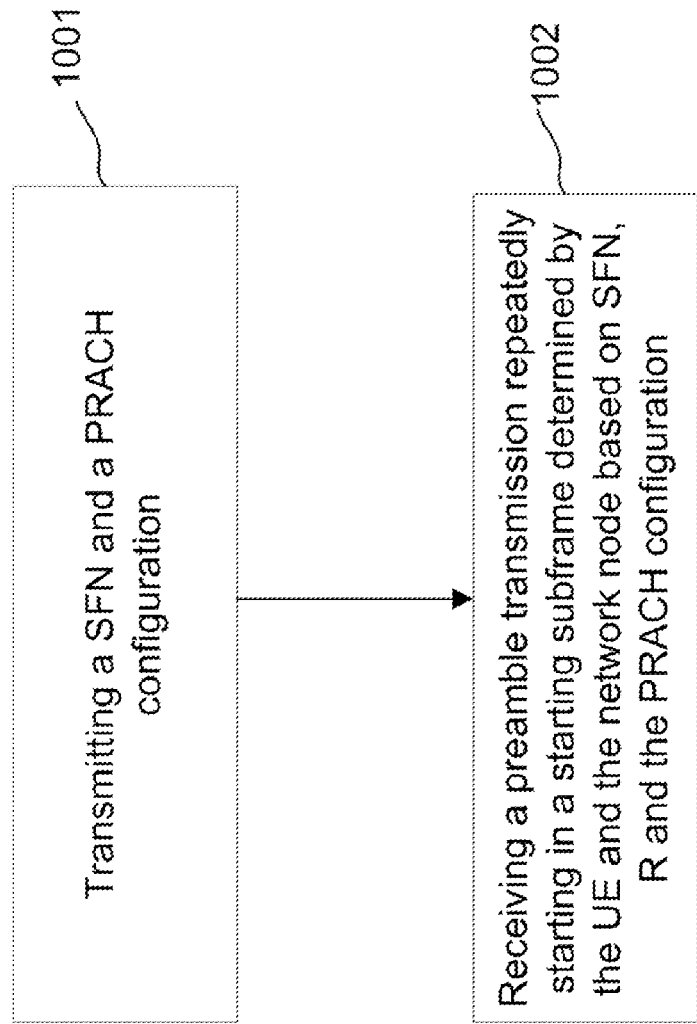
FIG. 10 shows a method performed by a network node for receiving preamble transmission from a UE in accordance with herein.

FIG. 10 illustrates a method performed by the network node 110 for receiving preamble transmissions from the UE 121 on the PRACH.

As shown, the main steps performed by the network node 110 comprise:

(1001) transmitting a SFN and a random access channel configuration to the UE 121; and (1002) receiving the preamble transmission repeatedly starting in a starting subframe wherein the starting subframe is determined by the UE 121 and the network node 110 based on at least on the SFN, the random access channel configuration and a number of times (R) the preamble transmission is to be repeated.

Similarly to the actions performed by the UE 121, the network node 110 determines the starting subframe based on a first offset T being dependent on the random access channel configuration. As previously described, the starting subframe is determined for a frame with SFN as any subframe i fulfilling equation 3 presented before which is repeated here.

$$0 = ((SFN+T)\cdot N + i) \bmod R$$

wherein, i is a subframe comprising radio resources configured for the random access channel in frame SFN, wherein $i = 0, \ldots, N_{SFN} - 1$;

T is the first offset dependent on the random access channel configuration and takes value T=1 if radio resources configured for the random access channel are available in only odd-number subframes, otherwise T=0;

$N_{SFN}$ is the number of subframes comprising at least one random access channel resource in frame with SFN;

N is the average number of subframes comprising at least one random access channel resource;

T, N and $N_{SFN}$ being derived from the random access channel configuration provided by the network node to the UE; and mod is the modulo operation.

According to an embodiment, the network node may determine the starting based on a second offset K being a cell identifier such as, a physical cell identity, PCI, transmitted to the UE during synchronization with the UE or the second offset is a cell identity transmitted in a system information block to the UE.

The starting subframe may further be determined based on a preamble sequence dependent offset; wherein the preamble sequence dependent offset is a function of a number of available preambles for the number of times the preamble transmission is to be repeated, or the preamble sequence dependent offset is a function of a physical random access channel sequence index.

When both the first offset value T and the second offset value K are used, the network node determines the starting subframe for a frame with SFN as any subframe i fulfilling equation 4 presented before which is repeated below:

$$0 = ((SFN+T)\cdot N + i + K) \bmod R$$

wherein, i is a subframe comprising radio resources configured for the random access channel in a frame SFN, wherein $i = 0, \ldots, N_{SFN} - 1$;

T is a first offset dependent on the random access channel configuration and takes value T=1 if radio resources configured for the random access channel are available in only odd-number subframes, otherwise T=0;

$N_{SFN}$ is the number of subframes comprising at least one random access channel resource in frame with SFN;

N is the average number of subframes comprising at least one random access channel resource;

T, N and $N_{SFN}$ being derived from the random access channel configuration provided by the network node to the UE;

K is the second offset,

Several advantages are achieved by embodiments described herein. An advantage is to avoid preamble collisions since a defined starting point for each repeated PRACH preamble transmission is determined. Both the UE and the network determine the starting point and hence know when a repeated preamble transmission by the user equipment is to occur.

Another advantage achieved by embodiments herein is that system performance and user experience are improved since overhearing of repeated PRACH preamble transmissions in other (neighbouring) cells is reduced.

Yes another advantage achieved is that by introducing means to determine the start subframe, and implicitly the end subframe, of the repeated PRACH transmission of the UE, the network node complexity and PRACH false alarm probability may be reduced.

Figures 11, 12:
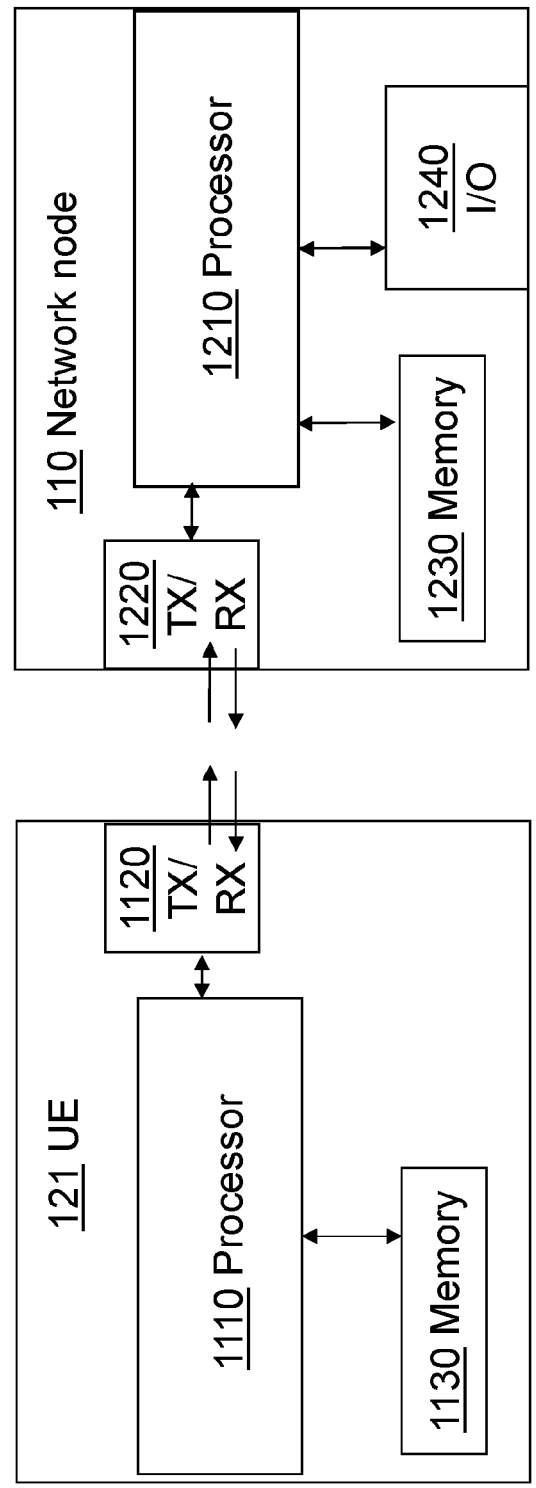
FIG. 11 is a schematic block diagram of a UE according to an exemplary embodiment herein.
FIG. 12 is a schematic block diagram of a network node according to an exemplary embodiment herein.

To perform the method actions described earlier, a UE 121 and a network node 110 are provided in accordance with FIGS. 11-12.

FIGS. 11-12 are schematic block diagrams of embodiments of the UE 121 and the network node 110. The UE 121 is configured to perform the methods related to the UE according to embodiments described before. The network node 110 is also configured to perform the methods related to network node according to embodiments described above.

The embodiments for performing preamble transmissions on a random access channel to a network node 110 in a radio communication network 100, wherein the preamble transmission is repeated one or more times in radio resources configured for the random access channel, may be implemented through one or more processors 1110 in the UE 121 depicted in FIG. 11, together with computer program code for performing the functions and/or method actions of the embodiments herein. The program code mentioned above may also be provided as a computer program product, for instance in the form of a data carrier carrying computer program code for performing embodiments herein when being loaded into the UE 121. One such carrier may be in the form of a CD ROM disc. It is however feasible with other data carriers such as a memory stick. The computer program code may furthermore be provided as pure program code on a server and downloaded to the UE 121.

The UE 121 further comprises a transmitter TX and a receiver RX, or a transceiver 1120, over which the UE 121 may transmit/receive transmissions and information from the network node 110. The UE 121 further comprises a memory 1130. The memory 1130 may, for example, be used to store information, either configured in the UE 121 and/or received from the network node 110, to perform the methods described herein, etc.

The embodiments for enabling preamble reception on a random access channel from a UE 121 in a radio communication network 100, wherein the reception of the preamble transmission is repeated one or more times in radio resources configured for the random access channel, may be implemented through one or more processors 1210 in the network node 110 depicted in FIG. 12, together with computer program code for performing the functions and/or method actions of the embodiments herein. The program code mentioned above may also be provided as a computer program product, for instance in the form of a data carrier carrying computer program code for performing embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 comprises a transmitter TX and a receiver RX, or a transceiver 1220, over which the network node 110 may transmit/receive transmissions and information from the UE 121. The network node 110 further comprises a memory 1230. The memory 1130 may, for example, be used to store offset values and other information for performing the methods described herein, etc. The network node 110 may also comprise an input/output interface 1240, which may be used to communicate with other radio network entities or network nodes in a core network.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices. The different actions taken by the different nodes may be implemented with different circuits.

It should be noted that although terminology from 3GPP LTE has been used herein in order to exemplify some of the embodiments, this should not be seen as limiting to only the aforementioned system. As previously mentioned, other wireless systems, including WCDMA, WiMax, UMB and GSM, may also benefit from exploiting the ideas covered by the embodiments described herein.

Also note that terminology such as eNodeB and UE should be considered non-limiting and does in particular not imply a certain hierarchical relation between the two; in general "eNodeB" could be considered as first device or node and "UE" as a second device or node, and these two devices or nodes communicate with each other over some radio channel.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a user equipment for performing preamble transmissions on a random access channel to a network node, the method comprising:
   receiving a system frame number, SFN, from the network node;
   receiving a random access channel configuration from the network node, wherein the random access channel configuration comprises a first offset value indicating positions of subframes that are available for transmission and an average number of subframes, N, comprising at least one random access channel source;
   determining, from a System Information Block, SIB, received from the network node, a cell identifier associated with a cell to which the network and the user equipment belong;
   determining a number of times, R, a preamble transmission is to be repeated;
   determining a starting subframe for the preamble transmission(s) based at least on the received SFN, the received random access channel configuration, the cell identifier, and the determined number of times, R, the preamble transmission is to be repeated, such that a different starting subframe is determined for corresponding cells based on respective cell identifiers, wherein the starting subframe is offset by a second offset value being a cell-specific value associated with the cell, wherein the second offset value is different from the cell identifier; and
   transmitting, to the network node, the preamble repeatedly starting in the determined starting subframe.

2. The method according to claim 1, wherein the SFN is received from the network node in a Master Information Block, MIB.

3. The method according to claim 1, wherein the random access channel configuration is received from the network node in a System Information Block, SIB.

4. The method according to claim 1, wherein the starting subframe is further determined based on an offset.

5. The method according to claim 4, wherein the offset depends on the received random access channel configuration.

6. A user equipment for performing preamble transmissions on a random access channel to a network node, the user equipment being configured to:
   receive a system frame number, SFN, from the network node;
   receive a random access channel configuration from the network node, wherein the random access channel configuration comprises a first offset value indicating positions of subframes that are available for transmission and an average number of subframes, N, comprising at least one random access channel source;
   determine, from a System Information Block, SIB, received from the network node, a cell identifier associated with a cell to which the network and the user equipment belong;
   determine a number of times, R, a preamble transmission is to be repeated;
   determine a starting subframe for the preamble transmission(s) based at least on the received SFN, the received random access channel configuration, the cell identifier, and the determined number of times, R, the preamble transmission is to be repeated, such that a different starting subframe is determined for corresponding cells based on respective cell identifiers, wherein the starting subframe is offset by a second offset value being a cell-specific value associated with the cell, wherein the second offset value is different from the cell identifier; and
   transmit, to the network node, the preamble repeatedly starting in the determined starting subframe.

7. The user equipment according to claim 6, wherein the SFN is received from the network node in a Master Information Block, MIB.

8. The user equipment according to claim 6, wherein the random access channel configuration is received from the network node in a System Information Block, SIB.

9. The user equipment according to claim 6, wherein the user equipment is configured to further determine the starting subframe based on an offset.

10. The user equipment according to claim 9, wherein the offset depends on the received random access channel configuration.

11. A method performed by a network node for receiving preamble transmission(s) from a user equipment on a random access channel, the method comprising:
   transmitting, to the user equipment, a system frame number, SFN;
   transmitting, to the user equipment, a random access channel configuration, wherein the random access channel configuration comprises a first offset value indicating positions of subframes that are available for transmission and an average number of subframes, N, comprising at least one random access channel source;
   determining, from a System Information Block, SIB, received from the network node, a cell identifier associated with a cell to which the network and the user equipment belong;
   determining a number of times, R, a preamble transmission is to be repeated;

determining a starting subframe for the preamble transmission(s) based at least on the SFN, the random access channel configuration, the cell identifier, and the determined number of times, R, the preamble transmission is to be repeated, such that a different starting subframe is determined for corresponding cells based on respective cell identifiers, wherein the starting subframe is offset by a second offset value being a cell-specific value associated with the cell, wherein the second offset value is different from the cell identifier; and receiving, from the user equipment, the preamble transmission repeatedly starting in the determined starting subframe.

12. The method according to claim 11, wherein the SFN is transmitted to the user equipment in a Master Information Block, MIB.

13. The method according to claim 11, wherein the random access channel configuration is transmitted to the user equipment in a System Information Block, SIB.

14. The method according to claim 11, wherein the starting subframe is further determined based on an offset.

15. The method according to claim 14, wherein the offset depends on the transmitted random access channel configuration.

16. A network node for receiving preamble transmission(s) from a user equipment on a random access channel, the network node being configured to:

transmit, to the user equipment, a system frame number, SFN;

transmit, to the user equipment, a random access channel configuration, wherein the random access channel configuration comprises a first offset value indicating positions of subframes that are available for transmission and an average number of subframes, N, comprising at least one random access channel source;

determine, from a System Information Block, SIB, received from the network node, a cell identifier associated with a cell to which the network and the user equipment belong;

determine a number of times, R, a preamble transmission is to be repeated;

determine a starting subframe for the preamble transmission(s) based at least on the SFN, the random access channel configuration, the cell identifier, and the determined number of times, R, the preamble transmission is to be repeated, such that a different starting subframe is determined for corresponding cells based on respective cell identifiers, wherein the starting subframe is offset by a second offset value being a cell-specific value associated with the cell, wherein the second offset value is different from the cell identifier; and receive, from the user equipment, the preamble transmission repeatedly starting in the determined starting subframe.

17. The network node according to claim 16, wherein the SFN is transmitted to the user equipment in a Master Information Block, MIB.

18. The network node according to claim 16, wherein the random access channel configuration is transmitted to the user equipment in a System Information Block, SIB.

19. The network node according to claim 16, wherein the network node is configured to further determine the starting subframe based on an offset.

20. The network node according to claim 19, wherein the offset depends on the transmitted random access channel configuration.

* * * * *